United States Patent
Cho et al.

(10) Patent No.: US 9,497,596 B2
(45) Date of Patent: Nov. 15, 2016

(54) SYSTEM AND METHOD FOR FILTERING MOBILE TERMINAL LOCATION BY COMBINING WI-FI LOCATION INFORMATION WITH SENSOR INFORMATION

(71) Applicant: ELECTRONICS AND TELECOMMUNICATIONS RESEARCH INSTITUTE, Daejeon-si (KR)

(72) Inventors: Young Su Cho, Daejeon-si (KR); Myung In Ji, Daejeon-si (KR); Joo Young Kim, Daejeon-si (KR); Yang Koo Lee, Cheongju-si (KR); Sang Joon Park, Daejeon-si (KR); Jong Hyun Park, Daejeon-si (KR)

(73) Assignee: ELECTRONICS AND TELECOMMUNICATIONS RESEARCH INSTITUTE, Daejeon-Si (KR)

(*) Notice: Subject to any disclaimer, the term of this patent is extended or adjusted under 35 U.S.C. 154(b) by 0 days.

(21) Appl. No.: 14/611,150

(22) Filed: Jan. 30, 2015

(65) Prior Publication Data
US 2015/0230058 A1 Aug. 13, 2015

(30) Foreign Application Priority Data
Feb. 11, 2014 (KR) .................. 10-2014-0015712

(51) Int. Cl.
H04W 24/00 (2009.01)
H04W 4/02 (2009.01)
H04W 64/00 (2009.01)
G01S 19/42 (2010.01)

(52) U.S. Cl.
CPC .......... *H04W 4/025* (2013.01); *H04W 64/006* (2013.01); *G01S 19/42* (2013.01); *H04W 24/00* (2013.01)

(58) Field of Classification Search
CPC . H04W 4/025; H04W 64/006; H04W 24/00; G01S 19/48; G01S 19/42
USPC ........................................... 455/456.1, 456.3
See application file for complete search history.

(56) References Cited

U.S. PATENT DOCUMENTS

| 8,751,151 | B2* | 6/2014 | Funk | G01C 21/206 |
| | | | | 340/539.13 |
| 8,812,234 | B2* | 8/2014 | Castaneda | G01C 21/16 |
| | | | | 340/995.28 |
| 9,097,536 | B2* | 8/2015 | Kelly | G01C 21/165 |
| 9,239,376 | B2* | 1/2016 | Mathews | G01C 21/165 |

(Continued)

FOREIGN PATENT DOCUMENTS

| KR | 10-1242973 B1 | 3/2013 |
| KR | 10-2013-0091082 A | 8/2013 |

OTHER PUBLICATIONS

Seitz et al. "Sensor Data Fusion for Pedestrian Navigation Using WLAN and INS," Proceedings of Gyro Technology Symposium 2007.*

Primary Examiner — Mong-Thuy Tran
(74) Attorney, Agent, or Firm — Rabin & Berdo, P.C.

(57) ABSTRACT

A system for filtering a terminal location by combining WiFi location information and sensor information, the system includes a filter that filters an inaccurate location of a terminal by combining location information calculated from WiFi signals and sensor information, and by using indicators to remove abnormal location information.

15 Claims, 4 Drawing Sheets

(56) References Cited

U.S. PATENT DOCUMENTS

| | | | |
|---|---|---|---|
| 9,414,239 B2* | 8/2016 | Brunk | H04W 24/00 |
| 2008/0004796 A1* | 1/2008 | Schott | G01C 21/005 |
| | | | 701/434 |
| 2012/0129546 A1* | 5/2012 | Yang | G01S 5/0252 |
| | | | 455/456.1 |
| 2012/0158297 A1 | 6/2012 | Kim et al. | |
| 2012/0309411 A1* | 12/2012 | MacGougan | H04W 64/006 |
| | | | 455/456.1 |
| 2013/0154879 A1* | 6/2013 | Ramakrishnan | G01S 19/426 |
| | | | 342/357.25 |
| 2013/0162481 A1* | 6/2013 | Parvizi | G01S 3/023 |
| | | | 342/452 |
| 2013/0273939 A1* | 10/2013 | Cho | H04W 64/00 |
| | | | 455/456.2 |
| 2015/0198447 A1* | 7/2015 | Chen | G01C 21/16 |
| | | | 701/472 |
| 2015/0285637 A1* | 10/2015 | Kelly | H04W 4/008 |
| | | | 701/430 |

* cited by examiner

SYSTEM AND METHOD FOR FILTERING MOBILE TERMINAL LOCATION BY COMBINING WI-FI LOCATION INFORMATION WITH SENSOR INFORMATION

CROSS-REFERENCE TO RELATED APPLICATION(S)

This application claims priority from Korean Patent Application No. 10-2014-0015712, filed on Feb. 11, 2014, in the Korean Intellectual Property Office, the entire disclosure of which is incorporated herein by reference for all purposes.

BACKGROUND

1. Field

The following description relates generally to positioning techniques, and more particularly to a technology for filtering inaccurate locations of mobile terminals.

2. Description of the Related Art

Positioning techniques using a wireless communication infrastructure vary depending on the types of infrastructure and service coverage. A global navigation satellite system (GNSS) is a system that determines a user's location by using signals from satellites orbiting the Earth, and examples thereof include a global positioning system (GPS) of the U.S., a global navigation satellite system (GLO-NASS) of Russia, a Galileo of Europe, and the like, which are currently in operation, or are scheduled to be operated. The GNSS, which is disposed to cover the entire globe, includes: a satellite that transmits signals that include precise visual information and satellite orbit information; a receiver that receives four or more satellite signals to calculate location and velocity; and a ground controller that monitors and controls satellite status and orbit.

In a case of level ground or a suburban area where a direct line of sight of a satellite and a receiver is secured, the GNSS provides high accuracy and availability within 10 meters, whereas in a case of a congested unban area that is a non-line of sight area, the error of location information is substantially 50 meters due to multipath errors, and sensitivity of a reception signal is degraded in an indoor environment, such that it fails to acquire a signal, and it is not possible to determine location and velocity.

A cellular-based positioning technique determines a user's location by using location information of a mobile communication base station and a measured signal, and may be classified into cell-ID, enhanced-observed time difference (E-OTD), advanced-forward link trilateration (AFLT), and the like, depending on the number of base stations available for a terminal. As characteristics of the mobile telecommunication infrastructure allow its services to be provided to most parts of urban and suburban areas, the cellular-based positioning technique may determine location even in an indoor environment, as well as in an outdoor environment, but its positioning accuracy varies depending on the disposition density of base stations, and it has a relatively low positioning accuracy of about 100 m to 800 m on average. For this reason, it is inappropriate to be used for indoor and outdoor navigation services or the like, which requires positioning accuracy of several meters or so.

Assisted GNSS technologies enhance minimum sensitivity of a reception signal of the GNSS receiver mounted in a user terminal, and acquire supplementary information from a positioning server to reduce time-to-first-fix (TTFF), thereby enabling fast determination of location in a congested urban area where a signal is weak. However, assisted GNSS technologies are not appropriate for an indoor environment, since a signal is significantly weak.

WiFi-based positioning techniques are provided to overcome the above difficulty of indoor positioning, and typical examples thereof include a method of calculating a terminal location by using WiFi access points (AP) and a measured signal, and a fingerprinting method using a radio map of WiFi access points (AP). In the WiFi AP-based positioning method, WiFi access points are estimated by using collected locations of vehicles or pedestrians and reception signal strength of WiFi access points, and then a terminal location is calculated by using positioning algorithms, such as Trilateration, weighted centroid localization (WCL), Monte-Carlo, or the like. In the fingerprint method, collected locations of vehicles and pedestrians and reception signal strength (RSS) of WiFi Aps are processed to generate a radio map of a reference location, and patterns of reception signal strength of WiFi APs measured in a terminal are compared to the generated radio map to estimate that a reference location having a minimal RSS error is a terminal location.

In view of the above analysis, the WiFi-based positioning techniques may provide relatively precise information on a terminal location in an indoor environment, compared to the conventional GNSS technique or a cellular-based positioning technique. However, the conventional WiFi-based positioning technique has difficulty providing heading information, which is useful information in addition to location information, such that it may be difficult to filter abnormal information. Further, in a case of a pedestrian who is moving while holding a terminal, a formulated equation of motion may not be applied in the WiFi-based positioning technique since a pedestrian moves more freely compared to a user aboard an airplane or in a car.

A sensor-based positioning technique has technical characteristics that may make up for the drawbacks of the Wi-Fi-based positioning technique for indoor use. Basically, the sensor-based positioning technique calculates a terminal location by combining one or more of an accelerometer, a gyroscope, a magnetometer, a barometer, an inclinometer, a proximity sensor, and the like, which are mounted inside or outside a terminal. Such sensor-based positioning technique has the following effects. First, it is rarely affected by an external environment of a terminal, unlike the GNSS or the WiFi-based positioning techniques. That is, a terminal location is calculated by using internal physical characteristics of a sensor (acceleration, velocity, rotational speed, etc.) as information for direct measurement, such that it is not likely that measurement information may be distorted by a complex indoor environment. Secondly, a terminal location may be determined in every case even without a nearby positioning infrastructure. That is, in the WiFi-based positioning technique, a terminal location may be determined only if there are nearby WiFi APs, such that if there are no WiFi APs, a terminal location may not be determined, whereas in the sensor-based positioning technique, a terminal location may be calculated all the time by using sensor information as long as a sensor is connected to a terminal, such that terminal location information may be readily available. Thirdly, a sensor price is becoming reasonable with the development of a micro electro-mechanical systems (MEMS) technology and the widespread distribution of smartphones, such that a technology of mounting a sensor in a smartphone is being widely used, and the use of a sensor in combination with the conventional GNSS technique is being facilitated.

However, the sensor-based positioning technique also has drawbacks to be overcome. First, a sensor that employs the MEMS technology does not have a high quality, thereby requiring calibration before use to remove a sensor error component caused by bias, drift, or the like. However, if the calibration is not performed well, an error of a terminal location measured by using measurement information will increase significantly with the lapse of time. Further, values of sensor errors caused by bias or drift are different depending on a terminal environment, such as a temperature or the like, so a sensor may need to be calibrated for every terminal used. Secondly, the sensor-based positioning technique relates to relative positioning, rather than absolute positioning, such that an absolute location of a starting point is required to know an absolute location of a terminal. In order to overcome such drawbacks, the sensor-based positioning technique is required to be used in combination with the GNSS technique that may provide an absolute location, or with the WiFi-based positioning technique that is mapped with an absolute location. Thirdly, in order to provide a precise terminal location for an extended period of time, the sensor-based positioning technique needs to remove accumulated location errors by correction not only before determination of location, but also in the course of determination. For terminal correction, location information of the GNSS that may provide an absolute location is also used, and points of interest (POI) in a map may also be used for the correction.

SUMMARY

Provided is a technology for filtering an inaccurate terminal location by combining location information calculated from a received WiFi signal and sensor information.

In one general aspect, there is provided a system for filtering a terminal location by combining WiFi location information and sensor information, the system including a filter that filters an inaccurate terminal location by combining location information calculated from WiFi signals and sensor information, and by using indicators to remove abnormal location information.

The filter may have a Kalman filter structure.

The filter may use a standardized innovation indicator and an innovation covariance ratio indicator to remove abnormal location information.

The system may include: a filter time updater configured to generate state variables and covariance estimated at a current time by using state variables and covariance estimated at a prior time; a quality estimation calculator configured to calculate a standardized innovation value based on measurement information that includes WiFi location information and sensor information and on information generated by the filter time updater, and to calculate an innovation covariance ratio; a standardized innovation determiner configured to determine whether the standardized innovation value calculated by the quality estimation calculator is below a threshold, wherein in response to the standardized innovation value being determined to be below the threshold, both the WiFi location information and the sensor information are determined to be reliable, and in response to the standardized innovation value being determined not to be below the threshold, only the sensor information is determined to be reliable; a filter measurement updater configured to update state variables and covariance estimated at a current time by using measurement information of a current time that is provided according to results of reliability determination by the standardized innovation determiner; an innovation covariance ratio determiner configured to determine whether the innovation covariance ratio calculated by the quality estimation calculator is below the threshold; and a filtered location provider configured to provide state variables and covariance updated by the filter estimation updater in response to the innovation covariance ratio being determined by the innovation covariance ratio determiner to be below the threshold.

The system may further include a filter initializer configured to initialize the filter.

The initializer may initialize the filter again in response to the innovation covariance ratio being determined by the innovation covariance ratio determiner not to be below the threshold.

The filter time updater may use a pedestrian motion model that assumes a pedestrian motion is maintained at a constant speed on average.

The filter time updater may use a pedestrian dead reckoning (PDR).

In another general aspect, there is provided a method of filtering a terminal location by combining WiFi location information and sensor information, the method including: updating filter time to generate state variables and covariance estimated at a current time from state variables and covariance estimated at a prior time; calculating a standardized innovation value based on measurement information, which includes WiFi location information and sensor information, and on information generated by the filter time updater, and calculating an innovation covariance ratio; determining whether the standardized innovation value calculated by the quality estimation calculator is below a threshold, wherein in response to the standardized innovation value being determined to be below the threshold, determining both the WiFi location information and the sensor information to be reliable, and in response to the standardized innovation value being determined not to be below the threshold, determining only the sensor information to be reliable; updating state variables and covariance estimated at a current time by using measurement information of a current time that is provided according to results of reliability determination by the standardized innovation determiner; determining whether the innovation covariance ratio calculated by the quality estimation calculator is below the threshold; and providing state variables and covariance updated by the filter estimation updater in response to the innovation covariance ratio being determined by the innovation covariance ratio determiner to be below the threshold.

The method may further include initializing the filter in response to the innovation covariance ratio being determined not to be below the threshold.

Figure 1:
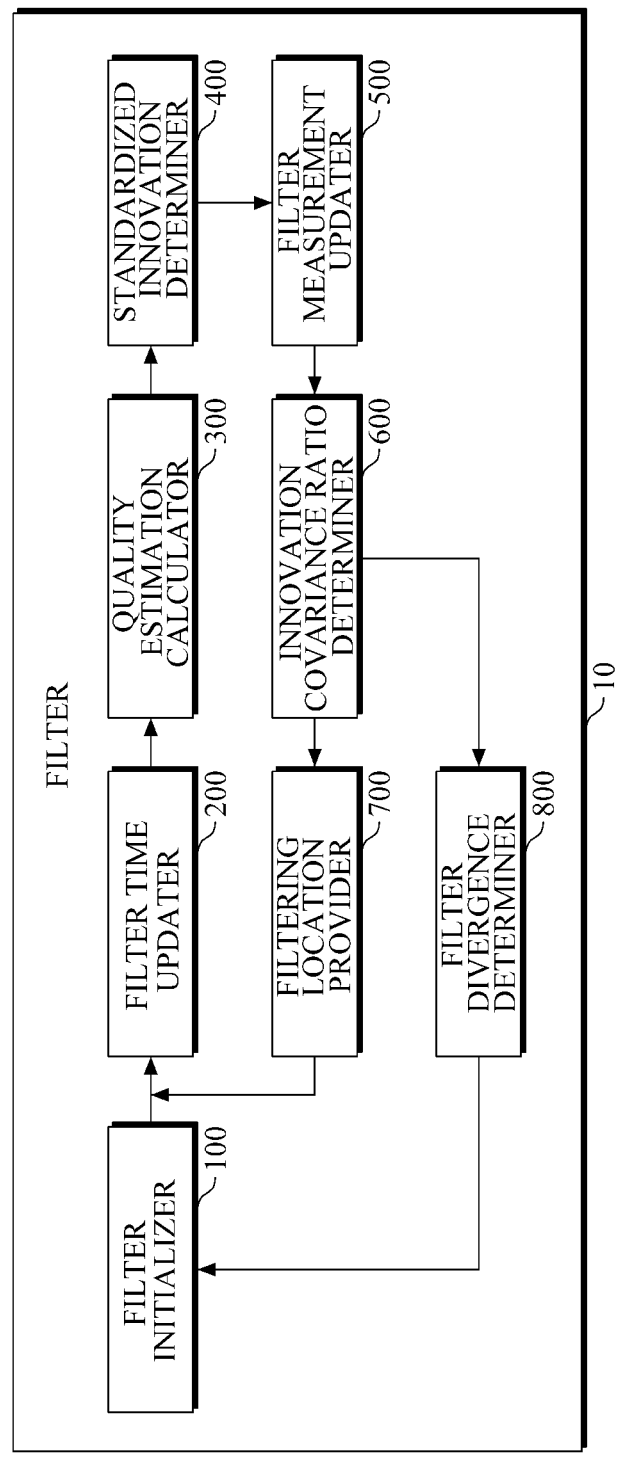
FIG. 1 is a block diagram illustrating an example of a system for filtering a terminal location by combining WiFi location information and sensor information according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a block diagram illustrating an example of a system for filtering a terminal location by combining WiFi location information and sensor information according to an exemplary embodiment. As illustrated in FIG. 1, the system for filtering a terminal location includes a filter 10. The filter 10 may be implemented in a processor as hardware, and may be called a multi-sensor fusion filter that performs filtering by combining various pieces of sensor information. As illustrated in FIG. 1, the filter 10 includes a filter initializer 100, a filter time updater 200, a quality estimation calculator 300, a standardized innovation determiner 400, a filter measurement updater 500, an innovation covariance ratio determiner 600, a filtering location provider 700, and a filter divergence determiner 800. The filter initializer 100 may set a process noise covariance (Q) and a measurement noise covariance (R) that are used by the filter time updater 200 and the filter measurement updater 500, respectively. Further, the filter initializer 100 may set initial values of estimation states and covariance variables, and may set thresholds for standardized innovation or measurement residual, and for covariance determination.

The filter time updater 200 may generate state variables and covariance estimated at a current time (t) by using a state transition model, and state variables and covariance estimated at a prior time (t−1). In the exemplary embodiment, in a case of estimating a motion state of a pedestrian, a position-velocity model or a velocity model is used as a state transition model on an assumption that there are no sudden changes in a pedestrian motion. Each model may be selected by considering covariance characteristics of WiFi location information and sensor information as measurement values.

As a first exemplary embodiment of the filter time updater 200, a pedestrian motion model is applied as follows. In the first exemplary embodiment, it is assumed that a constant velocity is maintained, as a pedestrian motion does not suddenly change as in a car or in an airplane. In the first exemplary embodiment, a pedestrian location (X, Y), a floor (F), a velocity (Vx, Vy) may be used as state variables.

$$\overline{x}_k = \begin{bmatrix} X_k \\ Y_k \\ F_k \\ V_{X_k} \\ V_{Y_k} \end{bmatrix} = \begin{bmatrix} 1 & 0 & 0 & T_s & 0 \\ 0 & 1 & 0 & 0 & T_s \\ 0 & 0 & 1 & 0 & 0 \\ 0 & 0 & 0 & 1 & 0 \\ 0 & 0 & 0 & 0 & 1 \end{bmatrix} \begin{bmatrix} X_{k-1} \\ Y_{k-1} \\ F_{k-1} \\ V_{X_{k-1}} \\ V_{Y_{k-1}} \end{bmatrix} + \begin{bmatrix} \frac{T_s^2}{2} & 0 \\ 0 & \frac{T_s^2}{2} \\ 0 & 0 \\ T_s & 0 \\ 0 & T_s \end{bmatrix} \begin{bmatrix} a_X \\ a_Y \end{bmatrix}$$

-continued $$\hat{x}_k^- = \Phi_{k-1} \hat{x}_{k-1}^+.$$
$$P_k^- = \Phi_{k-1} P_{k-1}^+ \Phi_{k-1}^T + Q_{k-1}.$$

$a_X$ or $a_Y$: random process that simulates the acceleration of the mobile device As a second exemplary embodiment of the filter time updater 200, a pedestrian dead reckoning (PDR) is applied as follows. A pedestrian motion, which is generally irregular and free, is difficult to be predicted by a conventional inertial model. In order to solve the problem, filter time is updated using a PDR algorithm. In the PDR, a difference between a previous position of a pedestrian and a current position thereof is calculated at every step by integrating a step width, a step length, and direction information, such that locations of a pedestrian based on time may be estimated consecutively. The PDR algorithm applied to the filter time updater 200 is as follows. In the second exemplary embodiment, a location (X, Y) of a pedestrian may be used as state variables.

$$\overline{x}_k = \begin{bmatrix} X_k \\ Y_k \end{bmatrix} = \begin{bmatrix} X_{k-1} + d_k \cdot \cos(\theta_k) \\ Y_{k-1} + d_k \cdot \sin(\theta_k) \end{bmatrix},$$

in which $d_k$ represents a step width, and $\theta_k$ represents a walking direction, and updating filter time is repeated every time a step is detected.

The quality estimation calculator 300 calculates the following two determination indicators to determine quality of measurement values. A first determination criterion is a standardized innovation value. The innovation value generally refers to a difference between an actual measurement value and an estimated measurement value, which may be represented by the following equation.

$$\text{Innovation} = z_k - H_k \cdot x_k$$

In the exemplary embodiment, as an actual measurement value is WiFi location information and sensor information, an innovation refers to an error in WiFi location information and sensor information at a current time. Generally, an innovation covariance ($H_k \cdot P_k \cdot H_k^T + R_k$) includes a sum of an innovation covariance component ($H_k \cdot P_k \cdot H_k^T$), which results from incompleteness of a state transition model, and an innovation covariance ($R_k$), which results from measurement noise. In the exemplary embodiment, in order to set a generally reliable range regardless of types of measurement values, a standardized innovation value is calculated, which is an indicator used in a reliability theory for determining reliability.

$$\text{standardized innovation} = \left| \frac{\text{innovation}}{\sqrt{\text{innovationcovariance}}} \right|$$

Here, a relation between a standardized innovation threshold and a reliability range (%) is shown in Table 1 below.

TABLE 1

| Standardized innovation threshold | Reliability range (%) |
|---|---|
| 1.00 | 67 |
| 1.29 | 80 |
| 1.65 | 90 |
| 1.96 | 95 |
| 2.58 | 99 |

For example, if a standardized innovation threshold is set at 1.00, and a standardized innovation value calculated by the quality estimation calculator 300 is below the threshold, it may be determined that the measurement value is above the reliability range of 67%.

A second determination criterion is an innovation covariance ratio. Generally, an innovation covariance $(H_k \cdot P_k \cdot H_k^T + R_k)$ includes a sum of an innovation covariance component $(H_k \cdot P_k \cdot H_k^T)$, which results from incompleteness of a state transition model, and an innovation covariance component $(R_k)$, which results from measurement noise. An innovation covariance ratio refers to a ratio of an innovation covariance component, which results from incompleteness of a state transition model, and an innovation covariance component, which results from measurement noise. The innovation covariance ratio may be represented by the following equation:

$$\text{Innovation covariance} = \frac{\text{Innovation covariance resulting from incompleteness of a state transition model}}{\text{Innovation covariance resulting from measurement noise}}$$

$$= \frac{H_k P_k H_k^T}{R_k} s$$

The standardized innovation determiner 400 determines whether a calculated standardized innovation is below the threshold. In the exemplary embodiment, if it is determined that X and Y values, which are WiFi location information, are below the threshold, both the WiFi location information and sensor information are determined to be reliable. If the above requirement is not satisfied, WiFi location information (X and Y values) is not determined to be reliable, and only the sensor information is determined to be reliable.

The filter measurement updater 500 may update covariance and state variables estimated at a current time by using measurement information of a current time (t) that is provided according to criteria determined by the standardized innovation determiner 400. In measurement according to a first exemplary embodiment of the filter measurement updater 500, both the sensor information and WiFi location information are applied as follows.

$$z_k = \begin{bmatrix} X_{WPS} \\ Y_{WPS} \\ V_{X_{PDR}} \\ V_{Y_{PDR}} \\ F_{WPS} \\ F_{PDR} \end{bmatrix} = \begin{bmatrix} X_{WPS_k} \\ Y_{WPS_k} \\ SL_k \cdot SF_k \cdot \sin\theta_k \\ SL_k \cdot SF_k \cdot \cos\theta_k \\ F_{WPS_k} \\ F_{PDR_k} \end{bmatrix} = \begin{bmatrix} 1 & 0 & 0 & 0 & 0 \\ 0 & 1 & 0 & 0 & 0 \\ 0 & 0 & 0 & 1 & 0 \\ 0 & 0 & 0 & 0 & 1 \\ 0 & 0 & 1 & 0 & 0 \\ 0 & 0 & 1 & 0 & 0 \end{bmatrix} \begin{bmatrix} X_k \\ Y_k \\ F_k \\ V_{X_k} \\ V_{Y_k} \end{bmatrix} +$$

$$\begin{bmatrix} v_{X_{WPS}} \\ v_{Y_{WPS}} \\ v_{V_{X_{PDR}}} \\ v_{V_{Y_{PDR}}} \\ v_{F_{WPS}} \\ v_{F_{PDR}} \end{bmatrix}$$

$$K_k = P_k^- H_k^T [H_k P_k^- H_k^T + R_k]^{-1}.$$
$$\hat{x}_k = \hat{x}_k^- + K_k [z_k - H_k \hat{x}_k^-].$$
$$P_k = P_k^- - K_k H_k P_k^-.$$

In measurement according to a second exemplary embodiment of the filter measurement updater 500, only the WiFi location information is applied as follows. In the second exemplary embodiment, when a WiFi location is newly calculated while estimating a motion location of a pedestrian using the PDR, the newly calculated WiFi location is reflected as a filter measurement value. In this exemplary embodiment, state variables are simple, which are locations (X, Y) of a pedestrian, such that it is appropriate for implementing a mobile terminal with limited processing capability and battery.

$$z_k = \begin{bmatrix} X_{k_{W-Pr}} \\ Y_{k_{W-Pr}} \end{bmatrix} = \begin{bmatrix} 1 & 0 \\ 0 & 1 \end{bmatrix} \begin{bmatrix} X_k \\ Y_k \end{bmatrix} + \begin{bmatrix} v_X \\ v_Y \end{bmatrix}$$

The innovation covariance ratio determiner 600 may determine whether an innovation covariance ratio defined as a second determination criterion by the quality estimation calculator 300 is below the threshold. Generally, an innovation covariance $(R_k)$ resulting from measurement noise is set as a constant, such that if an innovation covariance $(H_k \cdot P_k \cdot H_k^T)$ resulting from incompleteness of a state transition model gets higher, an innovation covariance ratio increases. By using such characteristics, if an innovation covariance ratio is above a threshold, it is determined that a filter diverges due to the incompleteness of the current state transition model. If an innovation covariance ratio is below a threshold, filtering continues. The threshold may be determined by experiments, and if a threshold is determined to be 2.00, it means that filtering may be available up to twice an innovation covariance resulting from incompleteness of a state transition model.

In a case where an innovation covariance value determined by the innovation covariance ratio determiner 600 is below a threshold, the filtered location provider 700 provides a final filtered location and a covariance value obtained by being processed through the filter time updater 200 and the filter measurement updater 500. Further, in a case where an innovation covariance value determined by the innovation covariance ratio determiner 600 is below a threshold, the filter divergence determiner 800 performs an initialization of a filter.

Figure 2:
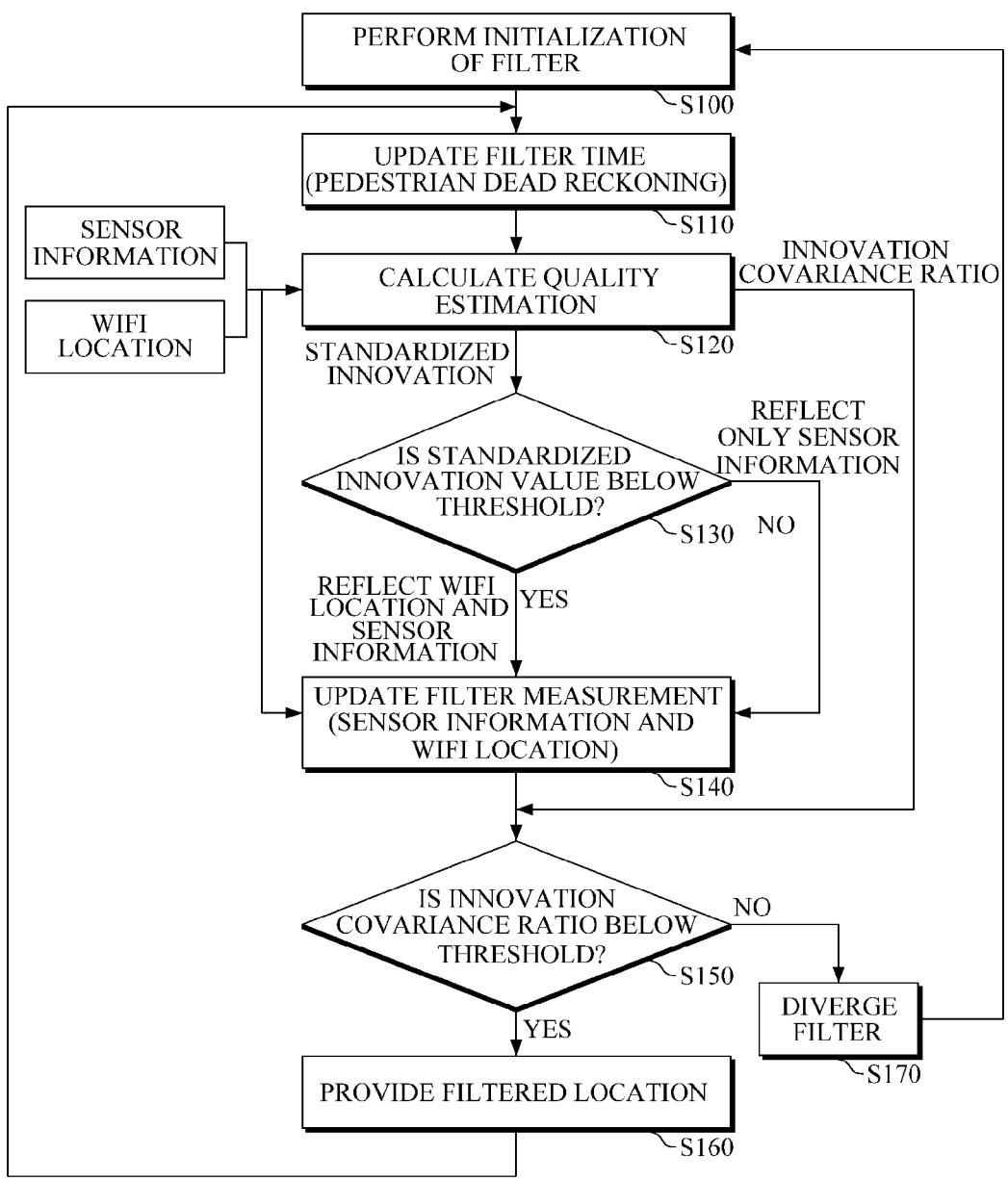
FIG. 2 is a flowchart illustrating an example of a method of filtering a terminal location by combining WiFi location information and sensor information according to an exemplary embodiment.

FIG. 2 is a flowchart illustrating an example of a method of filtering a terminal location by combining WiFi location information and sensor information according to an exemplary embodiment. First, the filter initializer 100 performs an initialization of a filter in S100. Upon completing the initialization, the filter time updater 200 updates filtering time in S110 to generate state variables and a covariance estimated at a current time from state variables and a covariance estimated at a prior time. In the exemplary embodiment, the filter time updater 200 updates filtering time using a pedestrian motion model. Next, the quality estimation calculator 300 calculates a standardized innovation value based on measurement information, including WiFi location and sensor information, as well as on information generated by the filter time updater 200, and performs a quality estimation calculation in S120 to calculate an innovation covariance ratio. Then, a standardized innovation determination is performed in S130, in which the standardized innovation determiner 400 determines whether a standardized innovation value calculated by the quality estimation calculator 300 is below a threshold, and if the standardized innovation value is below the threshold, both the WiFi location information and sensor information are determined to be reliable, and if the value is not below the threshold, only the sensor information is determined to be reliable.

The filter measurement updater 500 updates filter measurements in S140, in which state variables and covariance estimated at a current time are updated by using current time measurement information provided according to results of reliability determination by the standardized innovation determiner 400. State variables, of which measurement is to be updated by the filter measurement updater 500, are sensor information and WiFi location information. As illustrated in FIG. 2, if a standardized innovation is below a threshold, the filter measurement updater 500 updates state variables and covariance estimated at a current time by using both the WiFi location information and sensor information. If a standardized innovation is not below a threshold, only the sensor information is used to update state variables and covariance estimated at a current time. Further, the innovation covariance ratio determiner 600 determines an innovation covariance ratio in S150, in which it is determined whether an innovation covariance ratio calculated by the quality estimation calculator 300 is below a threshold. If it is determined that an innovation covariance ratio is below a threshold, the filter 10 provides a final filtered location, and a covariance value in S160. If it is determined that an innovation covariance ratio is not below a threshold, the filter 10 is initialized again in S170.

Figure 3:
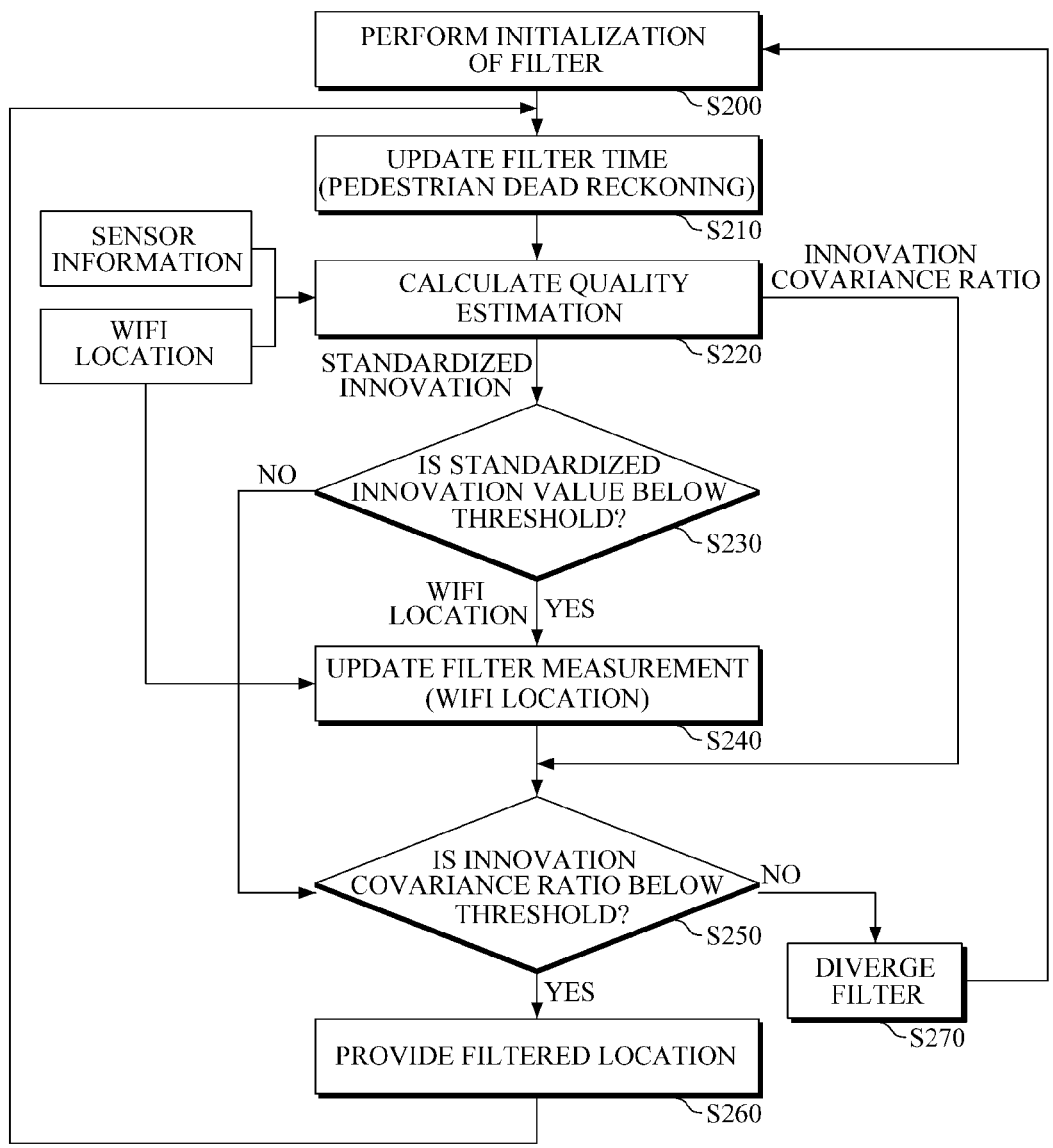
FIG. 3 is a flowchart illustrating another example of a method of filtering a terminal location by combining WiFi location information and sensor information.

FIG. 3 is a flowchart illustrating another example of a method of filtering a terminal location by combining WiFi location information and sensor information. S210 to S270 in the method of filtering a terminal location by combining WiFi location and sensor information as illustrated in FIG. 3 are identical to S110 to S170 illustrated in FIG. 2, with the only difference being in S210 and S240. Specifically, as illustrated in FIG. 3, the filter time updater 200 updates filtering time in S210 by using the PDR. Further, the filter estimation updater 500 updates filter measurements in S140, in which state variables and covariance estimated at a current time are updated by using measurement information of a current time provided according to results of reliability determination by the standardized innovation determiner 400. In this case, state variables, of which measurement is to be updated by the filter measurement updater 500, are only the WiFi location information. As described above, the exemplary embodiment illustrated in FIG. 3 is a case where only the WiFi location is applied. In the exemplary embodiment, state variables, which are locations (X, Y) of a pedestrian, are simple such that it is appropriate for implementing a mobile terminal with limited processing capability and battery.

Figure 4:
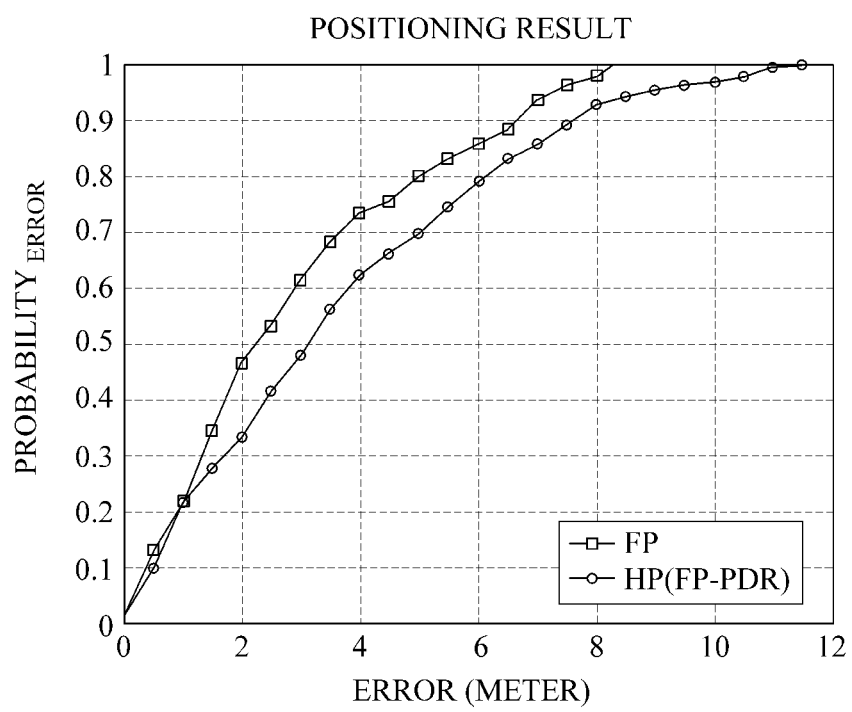
FIG. 4 is a graph illustrating a result of positioning performance improvement following combination filtering of WiFi location and sensor information.

FIG. 4 illustrates positioning performance in the case of applying the above described method of filtering a terminal location. After the filtering, it can be seen that a trajectory of location values has been smoothed without location values that are abnormally high or low. Further, with respect to positioning performance, it can also be seen that positioning accuracy has been improved by about 1 meter after the filtering (combining Wi-Fi location information and sensor information), when compared to an algorithm (Wi-Fi location) before the filtering.

Provided is a system and method of filtering an inaccurate terminal location by combining location information calculated from a received WiFi signal and sensor information. Particularly, the system and method has an additional feature of removing an abnormal measurement value of WiFi location and sensor information by adding a quality estimator to a Kalman filter, and using a standardized innovation and a covariance ratio of innovation, which are two filtering indicators calculated by the quality estimator. In this manner, more reliable measurement values may be used, thereby enhancing location accuracy of filtered location values, and producing a smoothing effect typical of the filtering.

Further, in an environment where no WiFi access points are installed such that only sensor information may be used to calculate a location, the filter of the present disclosure may be used to provide more stable and precise location information without any need to select a specific measurement technique for every location determination environment. In addition, velocity information may be provided in addition to location information smoothed by the filter of the present disclosure.

Moreover, after reliability of WiFi location information is examined, only the WiFi location information that has been determined to have reliability is reflected by input through the filter, such that location information with high reliability may be provided compared to a conventional combination filter.

In order to solve a problem of an unpredictable motion of a pedestrian, a pedestrian dead reckoning (PDR) algorithm is applied to a filter time updater, and a new filtering structure, in which WiFi location information is reflected to a filter measurement updater, is provided to facilitate implementation, and to reduce required calculations, and the like.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A system for filtering a terminal location by combining WiFi location information and sensor information, the system comprising a filter that filters an inaccurate terminal location by combining location information calculated from WiFi signals and sensor information, and by using indicators to remove abnormal location information;

wherein the filter uses a standardized innovation indicator and an innovation covariance ratio indicator to remove abnormal location information;

wherein the standardized innovation indicator corresponding to an indicator used in a reliability theory for determining reliability; and wherein the innovation covariance ratio indicator corresponding to a ratio of an innovation covariance component which results from incompleteness of a state transition model, and an innovation covariance component which results from measurement noise.

2. The system of claim 1, wherein the filter has a Kalman filter structure.

3. The system of claim 1, comprising:

a filter time updater configured to generate state variables and covariance estimated at a current time by using state variables and covariance estimated at a prior time;

a quality estimation calculator configured to calculate a standardized innovation value based on measurement information that includes WiFi location information and sensor information and on information generated by the filter time updater, and to calculate an innovation covariance ratio;

a standardized innovation determiner configured to determine whether the standardized innovation value calculated by the quality estimation calculator is below a threshold, wherein in response to the standardized innovation value being determined to be below the threshold, both the WiFi location information and the sensor information are determined to be reliable, and in response to the standardized innovation value being determined not to be below the threshold, only the sensor information is determined to be reliable;

a filter measurement updater configured to update state variables and covariance estimated at a current time by using measurement information of a current time that is provided according to results of reliability determination by the standardized innovation determiner;

an innovation covariance ratio determiner configured to determine whether the innovation covariance ratio calculated by the quality estimation calculator is below the threshold; and a filtered location provider configured to provide state variables and covariance updated by a filter estimation updater in response to the innovation covariance ratio being determined by the innovation covariance ratio determiner to be below the threshold.

4. The system of claim 3, further comprising a filter initializer configured to initialize the filter.

5. The system of claim 4, wherein the filter initializer initializes the filter again in response to the innovation covariance ratio being determined by the innovation covariance ratio determiner not to be below the threshold.

6. The system of claim 3, wherein the filter time updater uses a pedestrian motion model that assumes a pedestrian motion is maintained at a constant speed on average.

7. The system of claim 6, wherein the filter time updater uses a pedestrian dead reckoning (PDR).

8. The system of claim 6, wherein the state variables are locations and speeds of the pedestrian.

9. The system of claim 7, wherein the state variables are locations of the pedestrian.

10. A method of filtering a terminal location by combining WiFi location information and sensor information, the method comprising:

updating filter time to generate state variables and covariance estimated at a current time from state variables and covariance estimated at a prior time;

calculating a standardized innovation value based on measurement information, which includes WiFi location information and sensor information, and on information generated by a filter time updater, and calculating an innovation covariance ratio;

determining whether the standardized innovation value calculated by a quality estimation calculator is below a threshold, wherein in response to the standardized innovation value being determined to be below the threshold, determining both the WiFi location information and the sensor information to be reliable, and in response to the standardized innovation value being determined not to be below the threshold, determining only the sensor information to be reliable;

updating state variables and covariance estimated at a current time by using measurement information of a current time that is provided according to results of reliability determination by a standardized innovation determiner;

determining whether the innovation covariance ratio calculated by the quality estimation calculator is below the threshold; and providing state variables and covariance updated by a filter estimation updater in response to the innovation covariance ratio being determined by a innovation covariance ratio determiner to be below the threshold.

11. The method of claim 10, further comprising initializing the filter in response to the innovation covariance ratio being determined not to be below the threshold.

12. The method of claim 10, wherein the updating of the filter time comprises using a pedestrian motion model that assumes a pedestrian motion is maintained at a constant speed on average.

13. The method of claim 10, wherein the updating of the filter time comprises using a pedestrian dead reckoning (PDR).

14. The method of claim 12, wherein the state variables are locations and speeds of the pedestrian.

15. The method of claim 13, wherein the state variables are locations of the pedestrian.

* * * * *